(12) United States Patent  (10) Patent No.: US 8,345,016 B2
Amemiya  (45) Date of Patent: Jan. 1, 2013

(54) INPUT ASSISTING APPARATUS AND ELECTRONIC APPARATUS

(75) Inventor: Ryoji Amemiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 442 days.

(21) Appl. No.: 12/763,544

(22) Filed: Apr. 20, 2010

(65) Prior Publication Data

US 2010/0302186 A1 Dec. 2, 2010

(30) Foreign Application Priority Data

Jun. 2, 2009 (JP) .................................. 2009-132721

(51) Int. Cl.
*G06F 3/041* (2006.01)

(52) U.S. Cl. ........ 345/173; 345/168; 345/104; 345/169; 178/18.06; 463/37

(58) Field of Classification Search .......... 345/173–179, 345/104; 178/18.01–18.09, 19.01–19.03; 463/37; 341/22, 32–33; 200/5, 310, 313–314, 200/512, 517
See application file for complete search history.

(56) References Cited

U.S. PATENT DOCUMENTS

| | | | | |
|---|---|---|---|---|
| 5,742,241 A | * | 4/1998 | Crowley et al. | .................. 341/22 |
| 5,924,555 A | * | 7/1999 | Sadamori et al. | ............. 200/512 |
| 6,841,748 B2 | * | 1/2005 | Serizawa et al. | ............. 200/512 |
| 2005/0099403 A1 | * | 5/2005 | Kraus et al. | .................... 345/173 |
| 2010/0265201 A1 | * | 10/2010 | Oh | ............................... 345/173 |

* cited by examiner

*Primary Examiner* — Lun-Yi Lao
*Assistant Examiner* — Md Saiful A Siddiqui
(74) *Attorney, Agent, or Firm* — Oblon, Spivak, McClelland, Maier & Neustadt, L.L.P.

(57) ABSTRACT

An input assisting apparatus that is detachable from an electronic apparatus including a touch sensor panel including a plurality of first input areas assigned with input information includes: a main body having a first surface and a second surface, the first surface facing the touch sensor panel when the input assisting apparatus is attached to the electronic apparatus, the second surface being on an opposite side of the first surface; one or more elastically-deformable bulge portions that respectively correspond to one or more first input areas of the plurality of first input areas of the touch sensor panel and are provided to bulge from the second surface of the main body; and opening portions that are provided to the one or more bulge portions and expose at least a part of the one or more first input areas corresponding to the one or more bulge portions.

5 Claims, 20 Drawing Sheets

INPUT ASSISTING APPARATUS AND ELECTRONIC APPARATUS

BACKGROUND OF THE INVENTION

1. Field of the Invention

The present invention relates to an input assisting apparatus that is detachably provided to an electronic apparatus including a touch sensor panel and the electronic apparatus.

2. Description of the Related Art

In recent years, electronic apparatuses such as cellular phones and portable audio-visual apparatuses each including a touch sensor panel that detects positional information designated by a finger or the like of a user and generates input data from the user in accordance with the positional information have been provided. The user carries out an input operation by pressing an input area of the touch sensor panel. The input area of the touch sensor panel does not have irregularities like normal button-type operation keys, and therefore the user cannot obtain a natural operational feeling that is obtained when the user operates button-type operation keys.

In this regard, an input assisting apparatus for assisting the input operation made by the user with respect to the input area of the touch sensor panel is proposed (for example, see Japanese Patent Application Laid-open No. 2001-117721 (paragraphs [0007] to [0009], FIG. 2); hereinafter, referred to as Patent Document 1). According to Patent Document 1, a thin plate-like input assisting apparatus having an opening portion corresponding to an input area is installed on a surface of a touch sensor panel. A user presses the input area of the touch sensor panel that is exposed from the opening portion of the input assisting apparatus by a finger or the like and carries out an input operation. In the input operation, the user can tactually distinguish the input area of the touch sensor panel that is exposed from the opening portion from a surface of the input assisting apparatus, with the result that operability is improved.

SUMMARY OF THE INVENTION

However, in the input assisting apparatus of Patent Document 1, the user merely presses the input area of the touch sensor panel that is exposed from the opening portion of the input assisting apparatus and the press operation itself is the same as in a case where no input assisting apparatus is used. Accordingly, the user cannot obtain a natural operational feeling like a click feeling obtained when operating a button-type operation key in the press operation of the input area of the touch sensor panel.

Further, in a capacitive-type touch sensor panel, there are some cases where when a finger comes close to the input area of the touch sensor panel, capacitive coupling occurs and the input operation is made. Since the input assisting apparatus of Patent Document 1 is thin plate-like, a height from the input area of the touch sensor panel to the surface of the input assisting apparatus cannot be sufficiently secured. Accordingly, there is a fear that when the finger of the user is positioned in the vicinity of the opening portion of the input assisting apparatus, an erroneous detection in the input area located below the opening portion may be caused even when the finger does not come into contact with the input area of the touch sensor panel.

In view of the circumstances as described above, there is a need for an input assisting apparatus and an electronic apparatus that are capable of enhancing the operability.

According to an embodiment of the present invention, there is provided an input assisting apparatus including a main body, one or more bulge portions, and opening portions.

The input assisting apparatus is detachable from an electronic apparatus including a touch sensor panel including a plurality of first input areas assigned with input information.

The main body has a first surface and a second surface, the first surface facing the touch sensor panel when the input assisting apparatus is attached to the electronic apparatus, the second surface being on an opposite side of the first surface.

The one or more bulge portions respectively correspond to one or more first input areas of the plurality of first input areas of the touch sensor panel, are provided to bulge from the second surface of the main body, and are elastically deformable.

The opening portions are provided to the one or more bulge portions and expose at least a part of the one or more first input areas corresponding to the one or more bulge portions.

According to the input assisting apparatus, the one or more bulge portions are provided so as to bulge from the second surface of the main body on the opposite side of the first surface facing the touch sensor panel and are elastically deformable. Accordingly, a user can carry out an input operation with respect to the touch sensor panel via the elastically-deformable bulge portions. Due to the bulge portions that are elastically deformed, the user can obtain a natural operational feeling like a click feeling obtained when operating a button-type operation key in the input operation.

Further, since the bulge portions are provided so as to bulge from the second surface of the main body, the height from the touch sensor panel to the opening portions provided to the bulge portions can be sufficiently secured. Accordingly, an erroneous detection in the input area of the touch sensor panel is difficult to occur.

Since an erroneous detection is difficult to occur, the user can continuously perform operations while running fingers over the one or more bulge portions in a case of continuously performing input operations with respect to the plurality of first input areas, with the result that the user does not need to lift the fingers each time a operation is made to each of the first input areas and operability is improved.

Moreover, since the bulge portions are provided so as to bulge from the second surface of the main body, the user can tactually recognize the first input areas corresponding to the respective bulge portions, with the result that the operability is improved.

The bulge portions may have a thickness smaller than a thickness of a portion of the main body excluding the bulge portions.

According to the input assisting apparatus, it is possible to more reliably prevent an erroneous detection from occurring in the input area of the touch sensor panel due to the thickness of the portion of the main body excluding the bulge portions while ensuring predetermined elasticity of the bulge portions.

The touch sensor panel may further include a second input area for acquiring information on a trail of a position that is designated by a user.

The portion of the main body excluding the bulge portions may include a first portion having the second surface and a first thickness and a second portion having a third surface and a second thickness smaller than the first thickness and corresponding to the second input area, and a distance between the second surface of the first portion and a surface of the touch sensor panel may be larger than a distance between the third surface of the second portion and the surface of the touch sensor panel.

According to the input assisting apparatus, the second portion for making an input to the second input area and the first portion for preventing an erroneous input can be provided at the portion of the main body excluding the bulge portions. Here, the second input area is, for example, a touch pad used for inputting information on a trail of a position designated by the user. By making the second portion of the main body that corresponds to the second input area thinner than the first portion and making the distance between the second surface of the first portion and the surface of the touch sensor panel larger than the distance between the third surface of the second portion and the surface of the touch sensor panel, it is possible to select, as the thickness of the second portion, a value at which a change in a capacitance at the second portion by the touch sensor panel is detectable and make an input operation to the second input area.

The input assisting apparatus may further include an engagement portion that is detachably attached to the electronic apparatus.

According to another embodiment of the present invention, there is provided an electronic apparatus including a touch sensor panel, a display, a detector, and a switching section. The touch sensor panel includes a plurality of first input areas assigned with input information. The display is capable of selectively displaying a first screen including a plurality of user interface elements that correspond to the plurality of first input areas of the touch sensor panel and a second screen that is different from the first screen. The detector detects that an input assisting apparatus is attached. The switching section switches display from the second screen to the first screen when the detector detects that the input assisting apparatus is attached in a case where the second screen is displayed on the display.

According to the electronic apparatus, the first screen including the plurality of user interface elements that correspond to the plurality of first input areas of the touch sensor panel is displayed on the display panel when the input assisting apparatus is attached to the electronic apparatus in a case where the second screen is displayed on the display. Accordingly, a user operation for switching display from the second screen to the first screen on the display becomes unnecessary, with the result that convenience for the user is improved.

According to the input assisting apparatus and the electronic apparatus of the embodiments of the present invention, the operability can be enhanced.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, an embodiment of the present invention will be described with reference to the drawings.

(Structure of Electronic Apparatus 100)

Figure 1:
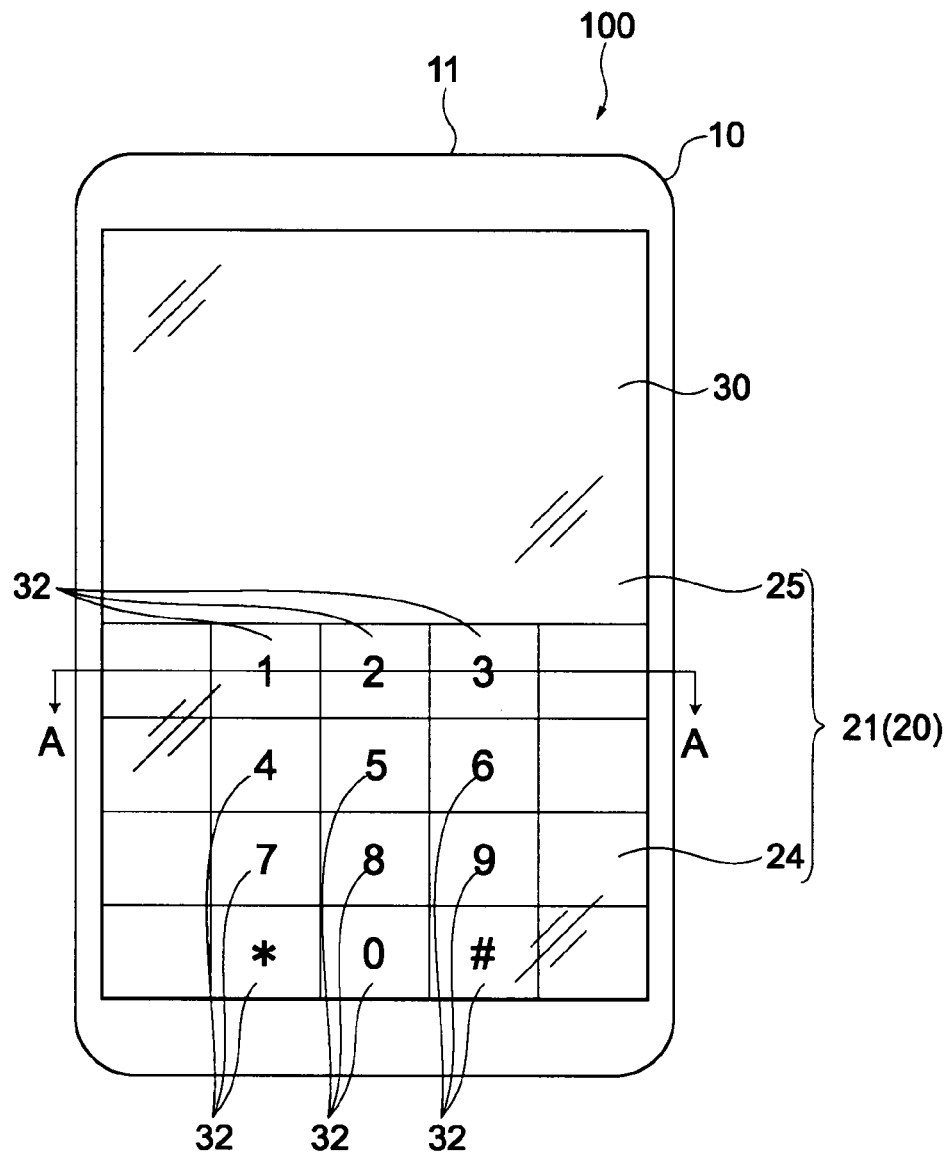
FIG. 1 is a plan view showing an electronic apparatus according to an embodiment of the present invention.
Figure 1:
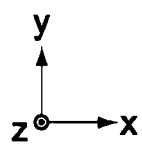
Figure 2:
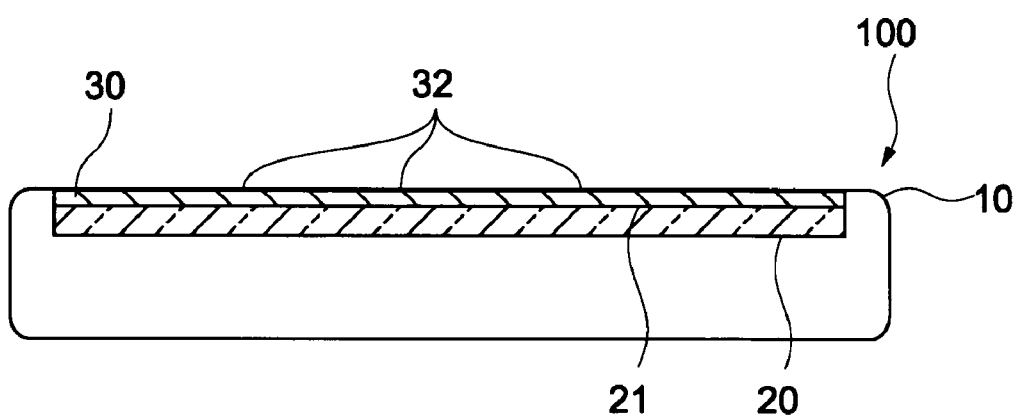
FIG. 2 is a schematic cross-sectional diagram showing the electronic apparatus taken along the line A-A of FIG. 1.
Figure 2:
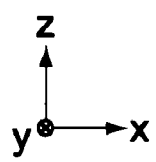

FIG. 1 is a plan view showing an electronic apparatus according to an embodiment of the present invention. FIG. 2 is a schematic cross-sectional diagram showing the electronic apparatus taken along the line A-A of FIG. 1. As shown in those figures, the electronic apparatus 100 includes a casing 10, a display panel 20, and a touch sensor panel 30. The electronic apparatus 100 is a terminal apparatus such as a cellular phone and a portable audio-visual apparatus.

The casing 10 includes a panel exposure portion 11 that is opened over a substantially rectangular surface. The casing 10 accommodates the display panel 20 and the touch sensor panel 30 in an overlapping manner. The touch sensor panel 30 is exposed from the panel exposure portion 11 so that a finger or the like of a user can come into contact with the touch sensor panel 30 from the outside.

The display panel 20 is, for example, an LCD (Liquid Crystal Display). A display area 21 of the display panel 20 includes a UI area 24 in which UI (User Interface) elements such as numeric keypad keys are displayed and a content display area 25 in which contents such as images are displayed.

The touch sensor panel 30 is arranged on at least the UI area 24 of the display area 21 of the display panel 20 and detects positional information that is designated by a finger or the like of a user with respect to an input area 32.

In descriptions below, directions of two axes forming the display area 21 are referred to as "X-axis direction" and "Y-axis direction", and a direction orthogonal to those X-axis direction and Y-axis direction is referred to as "Z-axis direction".

Figure 3:
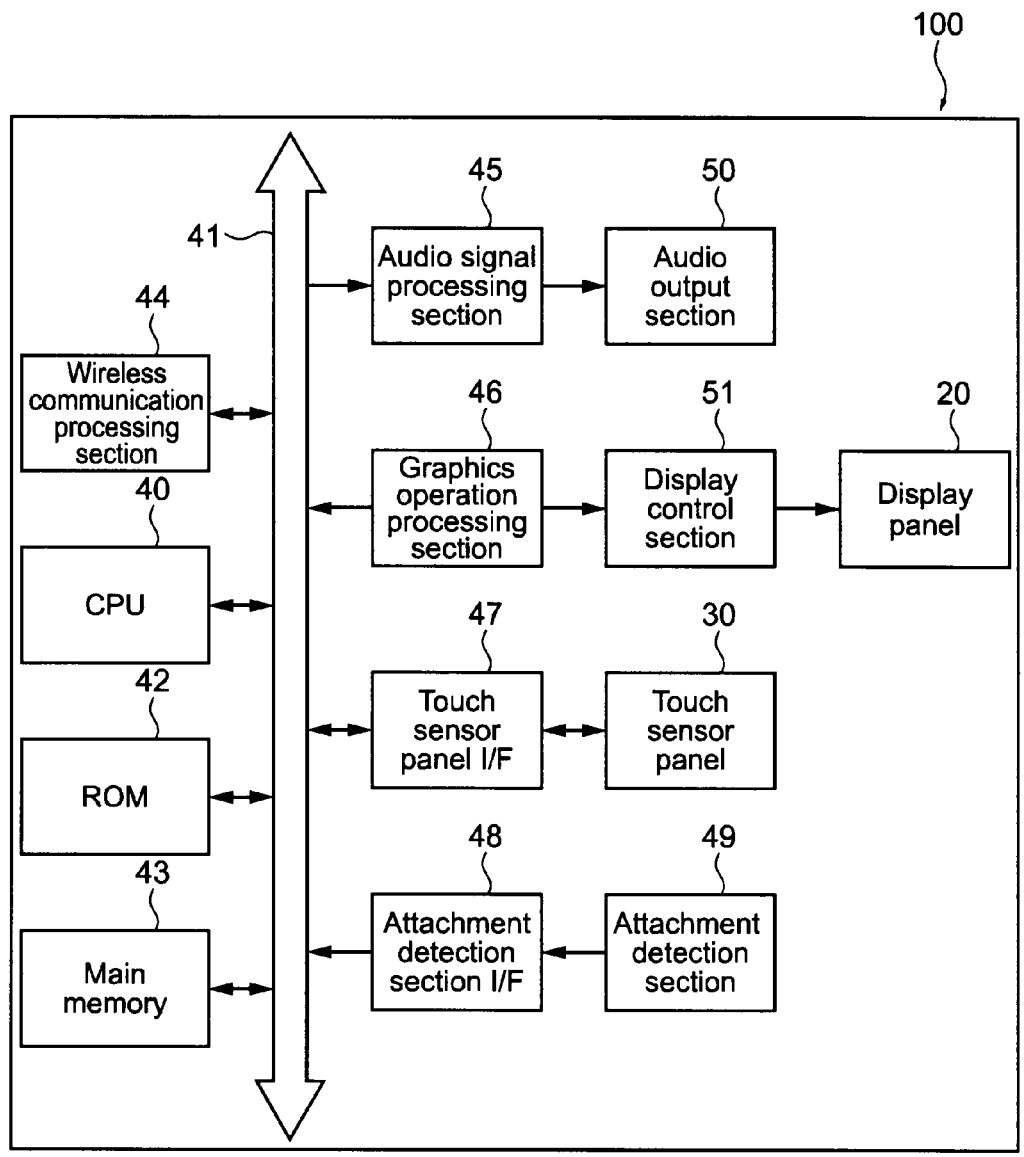
FIG. 3 is a block diagram showing a hardware structure of the electronic apparatus of FIG. 1.

FIG. 3 is a block diagram showing a hardware structure of the electronic apparatus 100. As shown in FIG. 3, connected to a CPU (Central Processing Unit) 40 via a system bus 41 are a ROM (Read Only Memory) 42, a main memory 43, a wireless communication processing section 44, an audio signal processing section 45, and a graphics operation processing section 46. Further connected to the system bus 41 are the touch sensor panel 30 via a touch sensor panel interface 47 and an attachment detection section 49 via an attachment detection section interface 48. An audio output section 50 is connected to the audio signal processing section 45. A display control section 51 is connected to the graphics operation processing section 46 and the display panel 20 is connected to the display control section 51.

The ROM 42 is a read-only memory that permanently stores programs and data for software processing to be executed by the electronic apparatus 100.

The main memory 43 is a memory used as a work area of the CPU 40.

The wireless communication processing section 44 is an interface for processing bidirectional communications with an external apparatus. Specifically, the wireless communication processing section 44 performs processing for a wireless communication with an external apparatus by using wireless media such as light, radio waves, sound waves, and electromagnetic waves. It should be noted that the communication with the external apparatus is not limited to a wireless communication and an interface for a wired communication may be adopted.

The audio signal processing section 45 generates an analog audio signal from a digital audio signal. The analog audio signal generated by the audio signal processing section 45 is output as sound from the audio output section 50 such as a speaker.

The attachment detection section 49 detects that an input assisting apparatus 200 is attached to the electronic apparatus 100. The input assisting apparatus 200 will be described later. A detection signal obtained by the attachment detection section 49 is supplied to the CPU 40 by the attachment detection section interface 48 via the system bus 41.

The graphics operation processing section 46 performs operation processing based on data received from the CPU 40, and generates and outputs a video signal to the display control section 51 so as to display it on the display panel 20. The graphics operation processing section 46 also performs operation processing for generating graphics data for displaying a screen (first screen) including UI elements such as numeric keypad keys and images on the display panel 20. Moreover, the graphics operation processing section 46 performs operation processing for generating graphics data for displaying a screen (second screen) that is different from the screen described above, e.g., a screen including an image all over the screen on the display panel 20.

The display control section 51 receives the video signal from the graphics operation processing section 46 and drives the display panel 20 based on the video signal so as to display the UI elements, the images, or the like in the display area 21.

The touch sensor panel 30 includes a plurality of input areas 32 (first input areas) each of which corresponds to the UI element displayed in the display area 21 and is assigned with input information. The touch sensor panel 30 processes various kinds of commands and input data that are input to the input areas 32 by a user using the touch sensor panel 30. The commands input by the user to the input areas 32 of the touch sensor panel 30 are supplied to the CPU 40 by the touch sensor panel interface 47 via the system bus 41.

(Structure of Input Assisting Apparatus 200)

Figure 4:
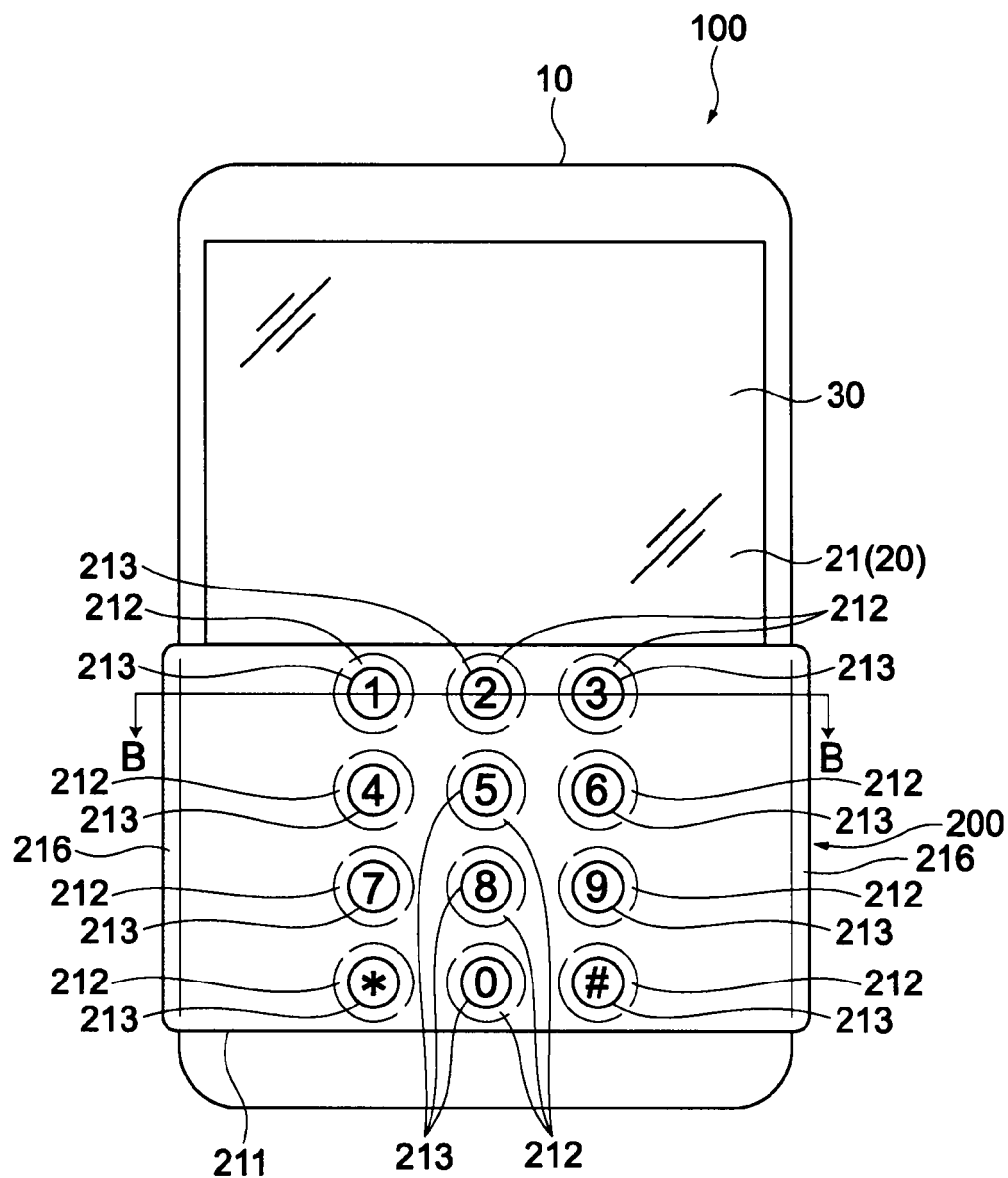
FIG. 4 is a plan view showing a state where an input assisting apparatus according to the embodiment is attached to the electronic apparatus of FIG. 1.
Figure 5:
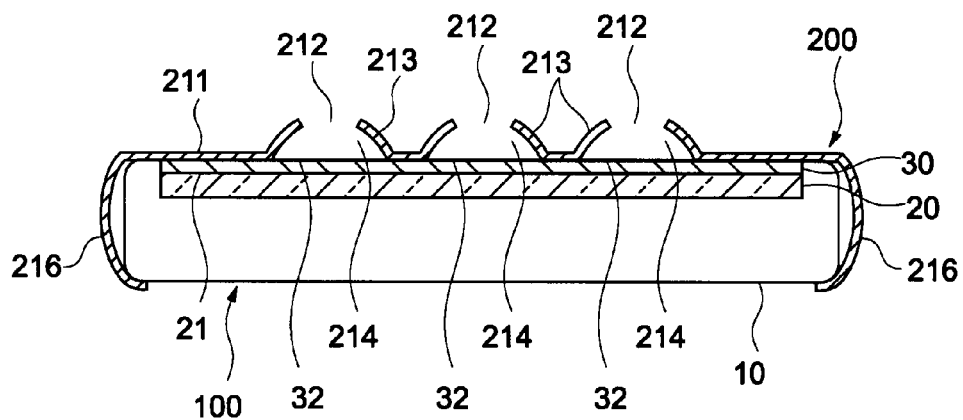
FIG. 5 is a schematic cross-sectional diagram showing the input assisting apparatus and the electronic apparatus that are taken along the line B-B of FIG. 4.
Figure 5:
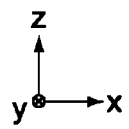

FIG. 4 is a plan view showing a state where the input assisting apparatus 200 according to the embodiment of the present invention is attached to the electronic apparatus 100. FIG. 5 is a schematic cross-sectional diagram showing the input assisting apparatus 200 and the electronic apparatus 100 that are taken along the line B-B of FIG. 4. As shown in those figures, the input assisting apparatus 200 has a main plate portion 211 that has a substantially uniform thickness and is thin plate-like. The main plate portion 211 is arranged at a portion corresponding to at least the UI area 24 within the display area 21 of the display panel 20 of the electronic apparatus 100.

The thin plate-like main plate portion 211 is provided with dome portions 213 each of which corresponds to the input area 32 of the touch sensor panel 30. The dome portion 213 bulges from one main surface of the main plate portion 211, specifically, an opposite surface of a surface facing the touch sensor panel 30. An opening portion 212 is provided at substantially the center of the dome portion 213. The opening portion 212 is formed so as to penetrate the main plate portion 211 in a circular shape, for example. Through the opening portion 212, a UI element of a corresponding input area 32 is exhibited. The dome portion 213 has a shape in which a circumference of the opening portion 212 bulges in an annular and dome-like manner. Accordingly, the inside of the dome portion 213 becomes a dome-like hollow 214. It should be noted that the opening portion 212 may desirably have a shape without corners or may be an oval shape or the like in addition to the circular shape shown in the figure.

As described above, since the dome portion 213 is provided with the opening portion 212, a user can carry out an input operation while viewing a UI element corresponding to each input area 32 of the display panel 20 through the opening portion 212 and bringing a finger or the like into direct contact with the input area 32.

The whole input assisting apparatus 200 is manufactured using an engineering plastic material such as PET (Polyethylene Terephthalate) or a rubber material such as silicon rubber. Accordingly, the dome portion 213 structured as described above is elastically deformable in the Z-axis direction and is elastically deformed with ease by a press operation by a finger or the like of a user. It should be noted that the material of the input assisting apparatus 200 may be an opaque material or a transparent material. In a case where the input assisting apparatus 200 is formed of a transparent material, visibility with respect to the display area 21 at a portion other than the opening portions is improved.

Engagement portions 216, 216 for attachment to the electronic apparatus 100 are provided at both ends in the X-axis direction of the main plate portion 211. Those engagement portions 216, 216 are provided so as to be engaged with both end portions in the X-axis direction of the casing 10 of the electronic apparatus 100 in a shape corresponding to an outer shape of the both end portions of the casing 10. More specifically, tips of the engagement portions 216, 216 are formed in a claw shape so that the input assisting apparatus 200 can be attached more stably by the casing 10 of the electronic apparatus 100. By manufacturing the whole input assisting apparatus 200 using an engineering plastic material such as PET, it is possible to easily detach the input assisting apparatus 200 from the electronic apparatus 100 while elastically deforming the engagement portions 216, 216. Alternatively, the input assisting apparatus 200 may be caused to slide in the Y-axis direction for detachment.

Figure 6:
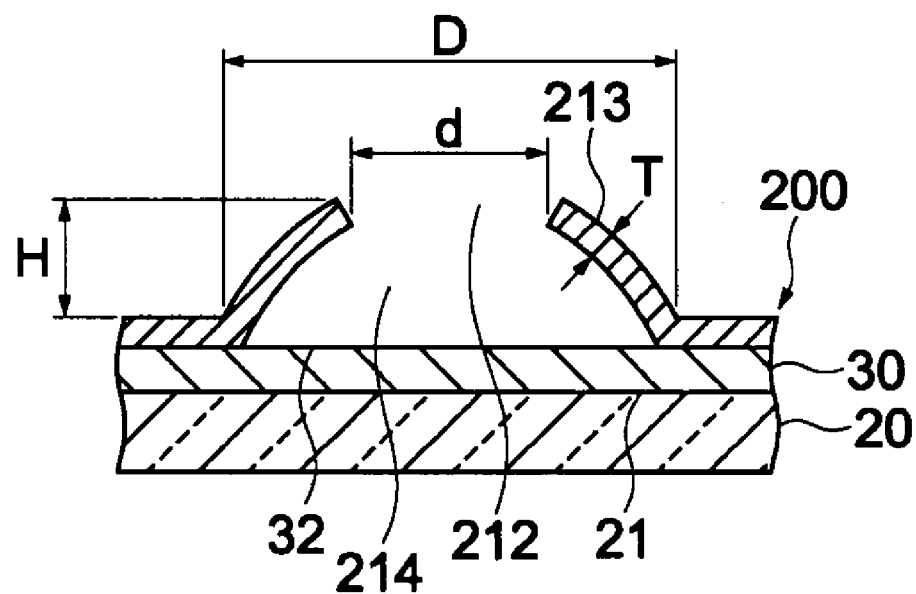
FIG. 6 is a diagram for explaining a dimensional example of a dome portion of the input assisting apparatus according to the embodiment.
Figure 6:
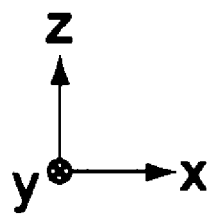

Next, a specific dimensional example of the dome portion 213 will be described with reference to FIG. 6. When the input assisting apparatus 200 is manufactured using a rubber material such as silicon rubber, a thickness of the main plate portion 211 to which the dome portion 213 is provided is about 1 mm, for example. In the dome portion 213 of this example, a height H from the surface of the main plate portion 211 to the opening portion 212 of the dome portion 213 is about 2.0 to 2.5 mm. A diameter D of the dome portion 213 is about 6 to 10 mm. A diameter d of the opening portion 212 is a value that satisfies D=2 d, for example, that is, about 3 to 5 mm. A thickness T of the dome portion 213 is equal or substantially equal to the thickness of the thin plate-like main plate portion 211 and is about 1 mm. It should be noted that when the input assisting apparatus 200 is manufactured using an engineering plastic material such as PET, the thickness of the main plate portion 211 may only need to be about 0.2 mm, for example.

(Input Operation Using Input Assisting Apparatus 200)

With reference to FIG. 7, an operation in a case where an input operation with respect to the touch sensor panel 30 of the electronic apparatus 100 is performed using the input assisting apparatus 200 will be described. It should be noted that the input assisting apparatus 200 is assumed to be attached to the electronic apparatus 100.

Figure 7A:
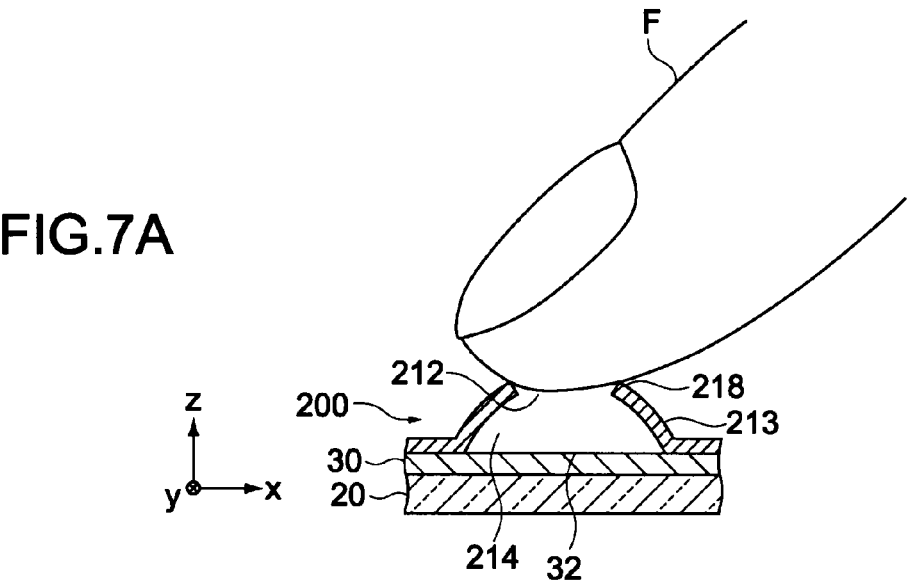
FIG. 7 are diagrams for explaining an input operation using the input assisting apparatus according to the embodiment.
Figure 7B:
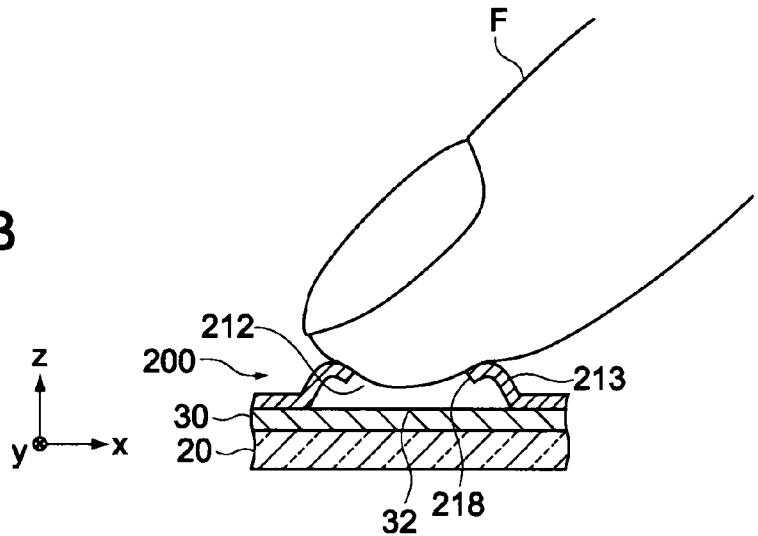

First, a finger F of a user abuts on an apex portion of the dome portion 213 (FIG. 7A). In this state, the finger F of the user is brought into contact with a circumferential portion 218 of the opening portion 212 of the dome portion 213. As a result, the finger F of the user is opposed to the input area 32 of the touch sensor panel 30 through the opening portion 212.

Figure 7C:
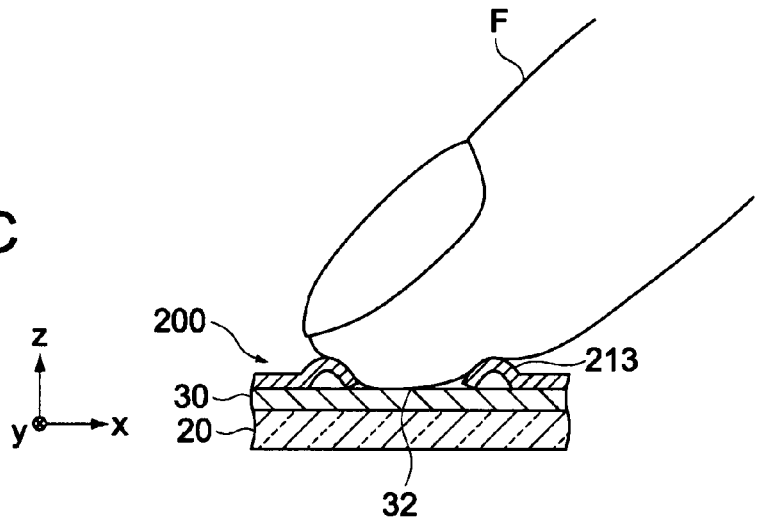

The finger F presses the dome portion 213 from that state. The dome portion 213 is started to be elastically deformed when a pressure that is applied from the finger F to the circumferential portion 218 of the opening portion 212 of the dome portion 213 becomes large (FIG. 7B), and thereafter the elastic deformation progresses at a stroke up to a position where the finger F comes into contact with the input area 32 of the touch sensor panel 30 (FIG. 7C).

During the course of the elastic deformation of the dome portion 213 as described above, the resistance that the user feels is maximum at a moment at which the dome portion 213 is elastically deformed for the first time and becomes small after the elastic deformation is started. Accordingly, such a change of the resistance can be imparted to the user as a click feeling.

According to the input assisting apparatus 200, the dome portion 213 is elastically deformed when a pressure of the finger F exceeds a predetermined value, and due to a change of the resistance along with the elastic deformation, the user can obtain a click feeling without feeling uncomfortable like a feeling obtained when the user operates a button-type operation key.

Further, since the dome portion 213 bulges from the main plate portion 211, the height from the input area 32 of the touch sensor panel 30 to the opening portion 212 of the dome portion 213 can be sufficiently secured. Accordingly, even when the touch sensor panel 30 is of a capacitive type, an erroneous detection in the input area 32 of the touch sensor panel 30 is difficult to occur.

Moreover, since the erroneous detection is difficult to occur as described above, the user can perform an operation while running fingers over the plurality of dome portions 213 in a case where an input operation is continuously made with respect to the plurality of input areas 32 of the touch sensor panel 30. Accordingly, the user does not need to lift the fingers at each time the operation is made, with the result that operability is improved.

Further, since the dome portion 213 bulges from the main plate portion 211, the user can tactually recognize the respective input areas 32 that are located in accordance with the plurality of dome portions 213. Accordingly, the input assisting apparatus 200 is also useful in a case where a user with visual impairments performs an input operation on the input areas 32 of the touch sensor panel 30.

(Input Operation Using Input Assisting Apparatus 300 of Comparative Example)

Here, an input operation with respect to the input areas 32 of the touch sensor panel 30 by using an input assisting apparatus 300 according to Comparative example will be described.

Figure 8:
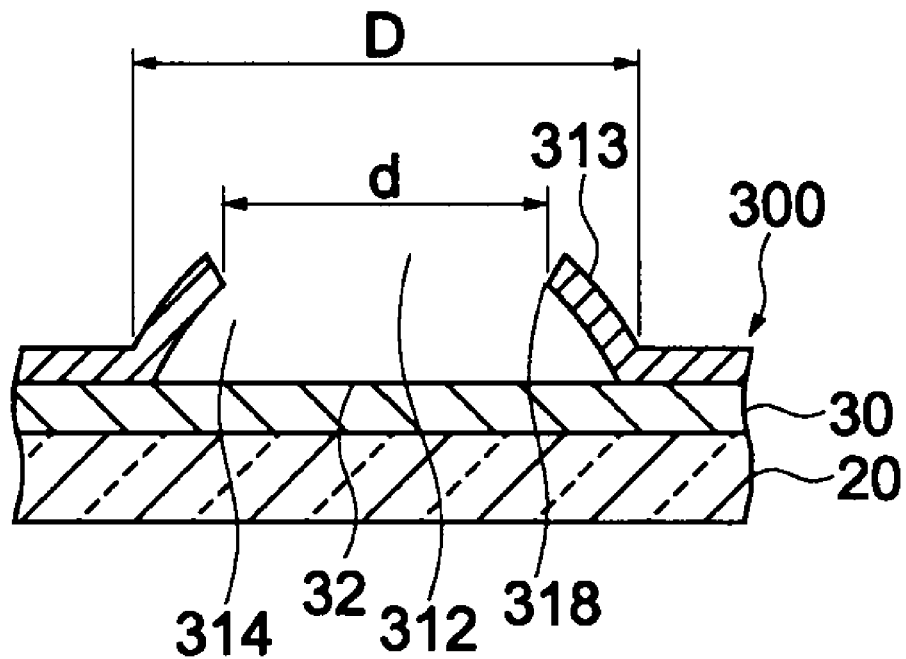
FIG. 8 is a diagram for explaining a dimensional example of a dome portion of an input assisting apparatus according to Comparative example.
Figure 8:
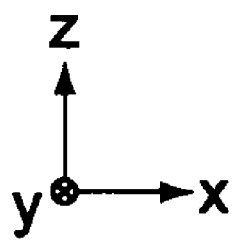

A dimensional example of the touch sensor panel 30 using the input assisting apparatus 300 according to Comparative example will be described with reference to FIG. 8. The input assisting apparatus 300 according to Comparative example includes a dome portion 313 that is different from the dome portion 213. The dome portion 313 of this example has the same curvature and diameter D as the dome portion 213 but has a different diameter d of an opening portion 312. In the dome portion 313, a relationship between the diameter D and the diameter d of the opening portion 312 is D<2 d.

With reference to FIG. 9, an operation in a case where an input operation is made with respect to the touch sensor panel 30 of the electronic apparatus 100 with use of the input assisting apparatus 300 will be described. It should be noted that the input assisting apparatus 300 is assumed to be attached to the electronic apparatus 100.

Figure 9A:
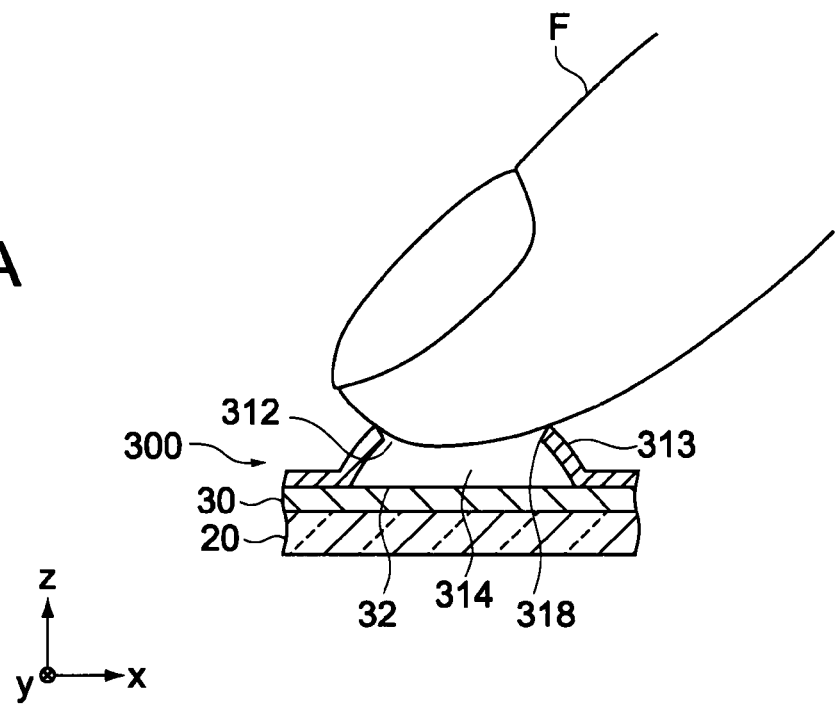
FIG. 9 are diagrams for explaining an input operation using the input assisting apparatus according to Comparative example.

First, a finger F of a user abuts on an apex portion of the dome portion 313 (FIG. 9A). In this state, the finger F of the user is brought into contact with a circumferential portion 318 of the opening portion 312 of the dome portion 313. As a result, the finger F of the user is opposed to the input area 32 of the touch sensor panel 30 through the opening portion 312. In this example, the finger F protrudes to a hollow 314 via the opening portion 312 by a large protruding amount as compared to a case of using the input assisting apparatus 200 shown in FIG. 7A above.

Figure 9B:
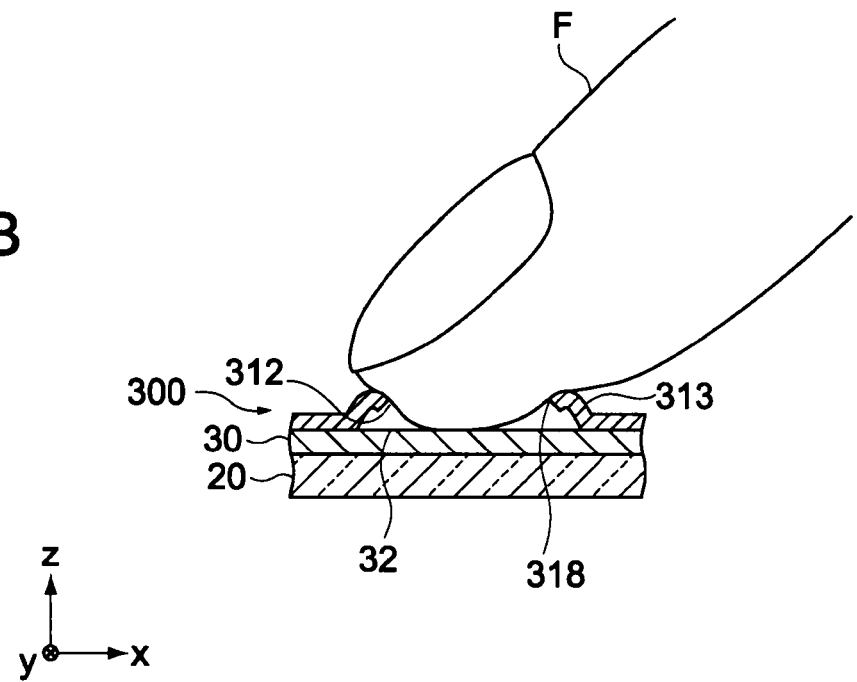

The finger F presses the dome portion 313 from that state. The dome portion 313 is elastically deformed when a pressure that is applied from the finger F to the circumferential portion 318 of the opening portion 312 of the dome portion 313 becomes large (FIG. 9B). The input assisting apparatus 300 has the opening portion 312 that is wide, and accordingly the finger F already protrudes to the hollow 314. Therefore, the finger F comes into contact with the input area 32 of the touch sensor panel 30 before the dome portion 313 is elastically deformed largely like the dome portion 213 shown in FIG. 7 above.

(Input Assisting Apparatus 200 Attachment Detection in Electronic Apparatus 100)

The description will return to the input assisting apparatus 200 and the electronic apparatus 100. A plurality of display modes are provided to the electronic apparatus 100. One of the modes is the mode to display the UI elements such as numeric keypad keys described above in the UI area 24 of the display area 21. Here, the mode to display the UI elements in the UI area 24 is referred to as "UI display mode". The electronic apparatus 100 has a full display mode that uses the entire display area 21 as a display area of a menu, an image, or the like, in addition to the UI display mode. The electronic apparatus 100 can switch display to the UI display mode when detecting that the input assisting apparatus 200 is attached in a case where the full display mode is displayed.

A mechanism of detecting that the input assisting apparatus 200 is attached in the electronic apparatus will now be described.

Figure 10:
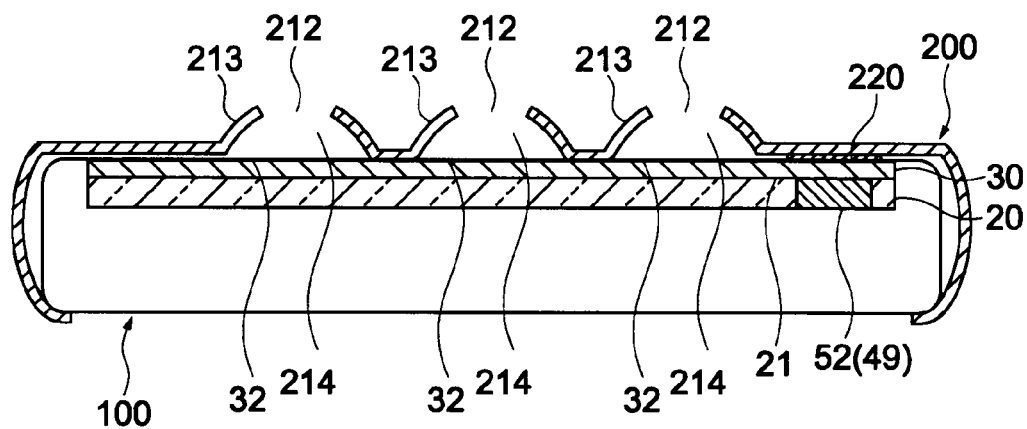
FIG. 10 is a schematic cross-sectional diagram for explaining a mechanism of detecting that the input assisting apparatus is attached in the electronic apparatus according to the embodiment.
Figure 10:
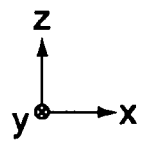

FIG. 10 is a schematic cross-sectional diagram for explaining a mechanism of detecting that the input assisting apparatus 200 is attached in the electronic apparatus 100. As shown in FIG. 10, the electronic apparatus 100 is provided with a magnetic sensor 52 serving as the attachment detection section 49 for detecting that the input assisting apparatus 200 is attached. The magnetic sensor 52 detects that the input assisting apparatus 200 is attached by detecting magnetism of a magnetic sheet 220 provided to the input assisting apparatus 200. For example, the magnetic sensor 52 can be provided to a surface or the like on which the touch sensor panel 30 is provided, but may be provided at a portion that is engaged with one engagement portion 216 of the input assisting apparatus 200.

Next, an operation of the electronic apparatus 100 at a time at which the input assisting apparatus 200 is attached will be described. It is assumed that the electronic apparatus 100 is operating in the full display mode and a menu, an image, or the like is displayed on the entire display area 21 of the display panel 20.

When the input assisting apparatus 200 is attached to the electronic apparatus 100, the magnetic sensor 52 as the attachment detection section 49 detects a magnetic flux that is radiated from the magnetic sheet 220 of the input assisting apparatus 200. The magnetic sensor 52 outputs a detection signal corresponding to the detected magnetic flux to the attachment detection section interface 48. The attachment detection section interface 48 performs processing such as conversion of the detection signal of the magnetic flux that has been output from the magnetic sensor 52 into a digital signal from an analog signal, and supplies the resultant to the CPU 40 via the system bus 41.

When the detection signal of the magnetic flux is input from the attachment detection section interface 48, the CPU 40 judges whether the detected magnetic flux has a predetermined threshold value or more. When judging that the detected magnetic flux has the threshold value or more, the CPU 40 switches the display mode from the full display mode to the UI display mode. In other words, the CPU 40 transmits data for displaying an image including UI elements such as numeric keypad keys to the graphics operation processing section 46 via the system bus 41. Accordingly, a UI area 24 is set in the display area 21 and the display mode is transferred from the full display mode to the UI display mode.

According to the mechanism of detecting that the input assisting apparatus 200 is attached, a user operation for switching the display mode becomes unnecessary, with the result that convenience for the user is improved.

It should be noted that the magnetic sensor 52 is provided at a portion of the electronic apparatus 100, at which the main plate portion 211 of the input assisting apparatus 200 is attached as shown in FIG. 10, but the attachment portion is not limited thereto. For example, the magnetic sensor 52 may be provided at a side surface portion or the like of the casing 10 of the electronic apparatus 100 and the magnetic sheet 220 may be provided to one engagement portion 216 of the input assisting apparatus 200.

Next, modified examples of the above embodiment will be described. Hereinafter, members, functions, and the like that are the same as those of the input assisting apparatus 200 and the electronic apparatus 100 according to the above embodiment are denoted by the same reference symbols, descriptions thereof are simplified or omitted, and differences will be mainly described.

MODIFIED EXAMPLE 1

First, a modified example of a mechanism of detecting attachment of an input assisting apparatus in an electronic apparatus will be described as Modified example 1.

Figure 11:
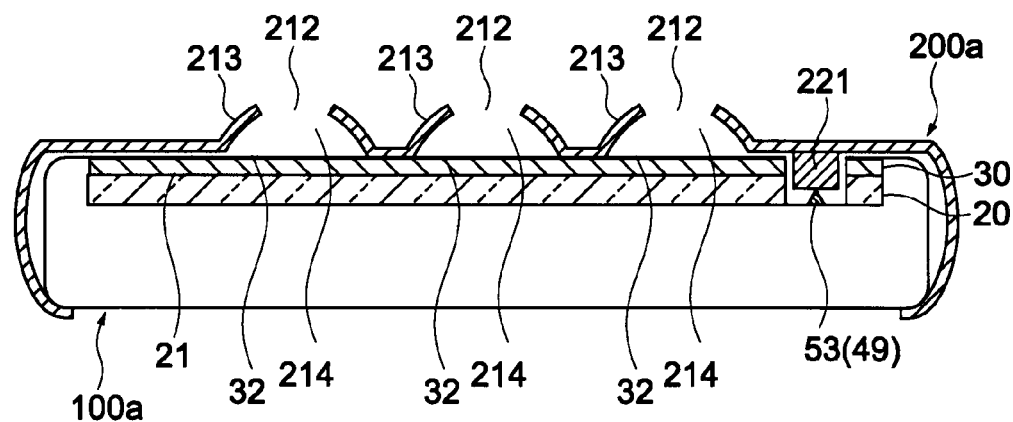
FIG. 11 is a schematic cross-sectional diagram for explaining a mechanism of detecting that an input assisting apparatus is attached in an electronic apparatus according to Modified example 1.

FIG. 11 is a schematic cross-sectional diagram for explaining a mechanism of detecting that an input assisting apparatus 200a is attached in an electronic apparatus 100a according to Modified example 1. As shown in FIG. 11, the electronic apparatus 100a is provided with a switch 53 serving as the attachment detection section 49 for detecting that the input assisting apparatus 200a is attached. The switch 53 is provided to the electronic apparatus 100a so as to be movable in the Z-axis direction and is in a state where a bias force is applied from the inside toward the outside of the electronic apparatus 100a by a bias means such as a spring (not shown). On the other hand, a protrusion 221 for operating the switch 53 while interfering with a tip of the switch 53 is provided in a protruding manner on a surface side of the input assisting apparatus 200a that faces the electronic apparatus 100a.

Next, an operation of the electronic apparatus 100a when the input assisting apparatus 200a is attached will be described. It is assumed that the electronic apparatus 100a is operating in the full display mode and a menu, an image, or the like is displayed on the entire display area 21 of the display panel 20.

When the input assisting apparatus 200a is attached to the electronic apparatus 100a, a tip of the protrusion 221 of the input assisting apparatus 200a interferes with the tip of the switch 53 of the electronic apparatus 100a, and the protrusion 221 presses down the switch 53 in a direction against the bias force by the bias means such as a spring. Accordingly, a detection signal indicating that the input assisting apparatus 200a is attached is output from the switch 53 to the attachment detection section interface 48. The attachment detection section interface 48 performs processing such as conversion of the output of the switch 53 into a digital signal, and supplies the resultant to the CPU 40 via the system bus 41. Upon being input with the detection signal indicating that the input assisting apparatus 200a is attached from the attachment detection section interface 48, the CPU 40 switches the display mode from the full display mode to the UI display mode. Accordingly, a UI area 24 is set in the display area 21 and the display mode is transferred from the full display mode to the UI display mode.

A user operation for switching the display mode becomes unnecessary also according to Modified example 1, with the result that convenience for the user is improved.

It should be noted that the case where the display mode is switched when it is detected that the input assisting apparatus 200a is attached to the electronic apparatus 100a has been described in Modified example 1 above, but the present invention is not limited thereto. By setting the switch 53 of the electronic apparatus 100a as a power switch, it may be possible to turn on the power of the electronic apparatus 100a when it is detected that the input assisting apparatus 200a is attached to the electronic apparatus 100a.

MODIFIED EXAMPLE 2

Next, a modified example of an input assisting apparatus will be described as Modified example 2.

Figure 12:
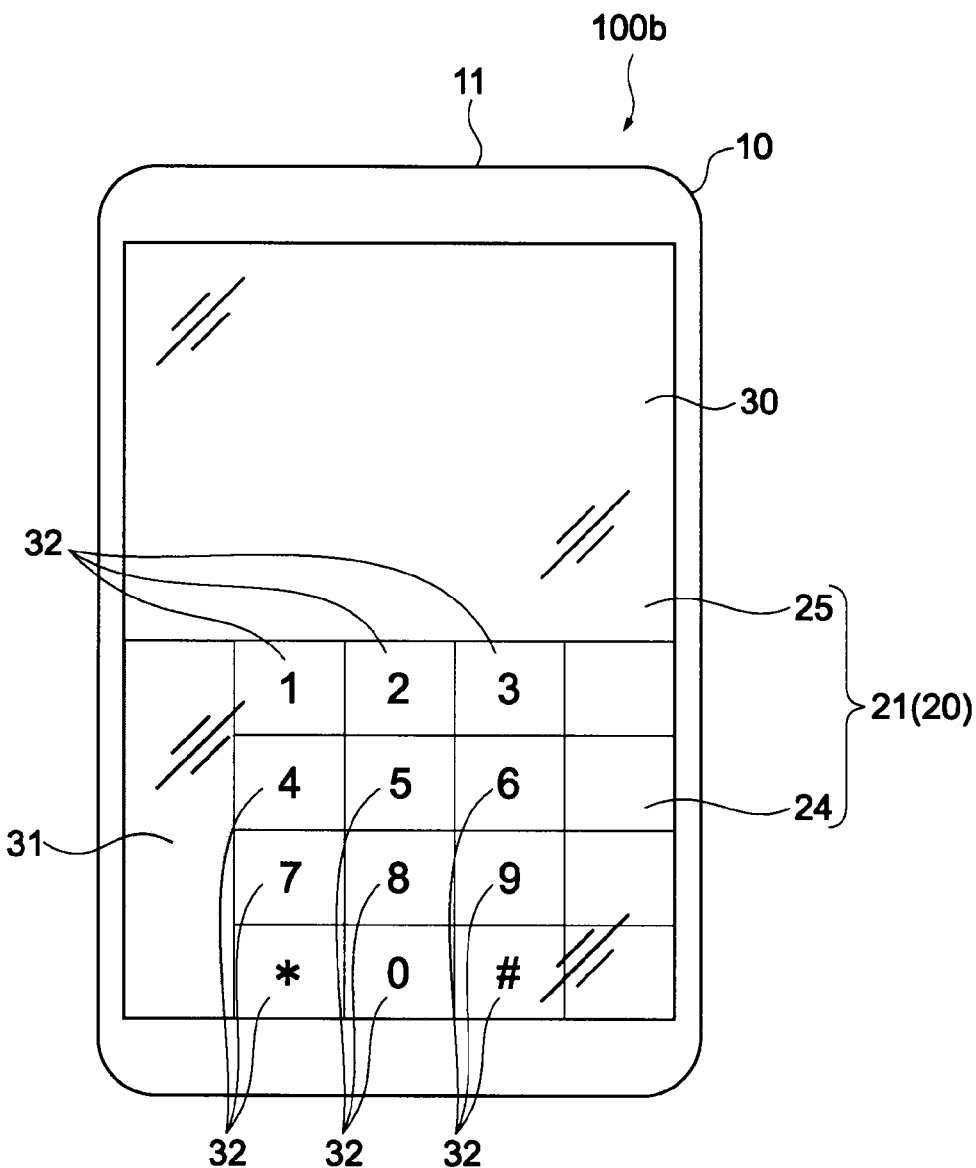
FIG. 12 is a plan view showing an electronic apparatus according to Modified example 2.
Figure 12:
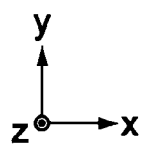

FIG. 12 is a plan view showing an electronic apparatus 100b according to Modified example 2. A touch pad input area 31 (second input area) is provided on the touch sensor panel 30 of the electronic apparatus 100b according to Modified example 2. The touch pad input area 31 is an area for obtaining information on a trail of a position designated by a user based on positional information that is detected by the touch sensor panel 30 in a temporally continuous manner.

Figure 13:
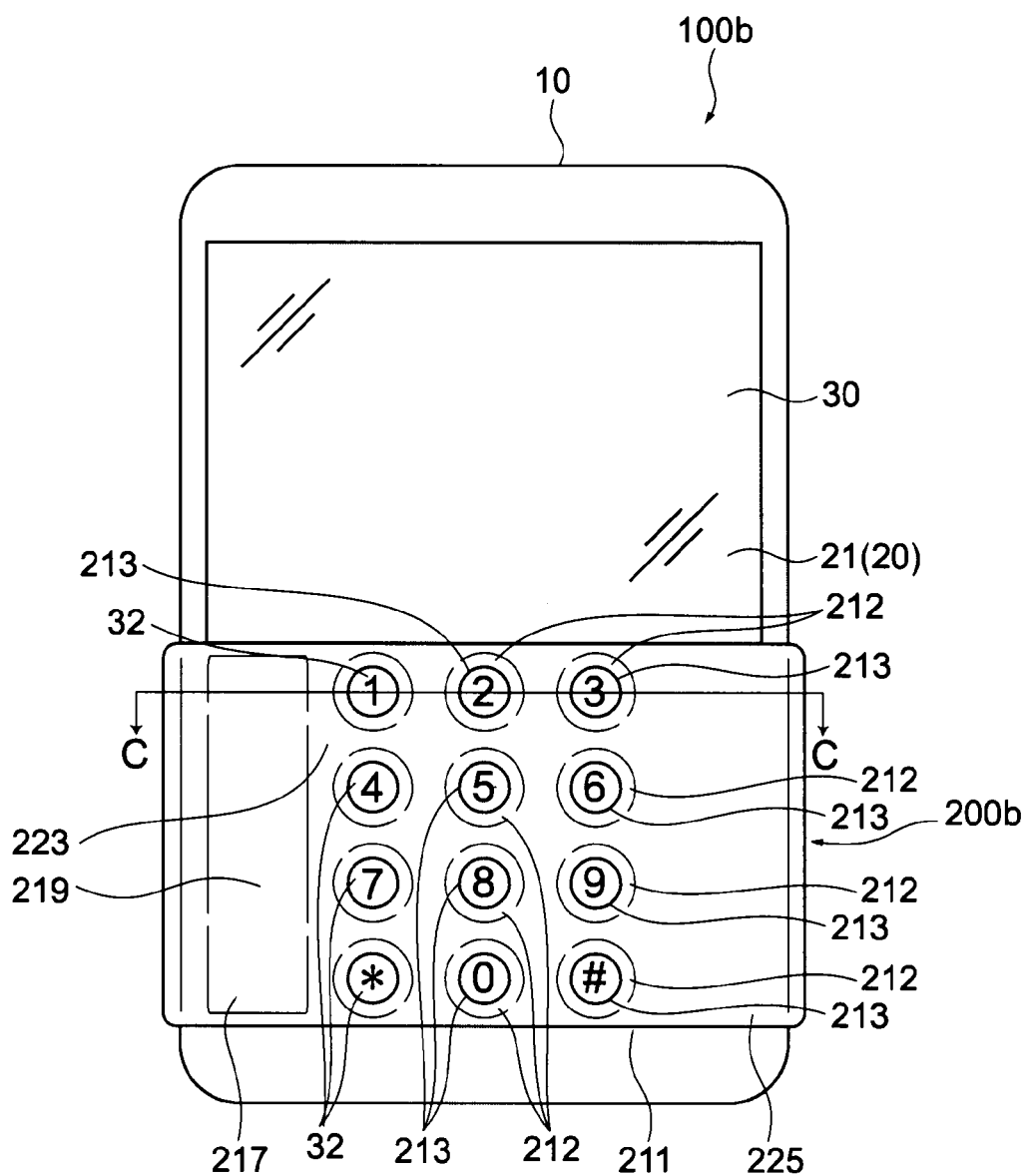
FIG. 13 is a plan view showing a state where an input assisting apparatus according to Modified example 2 is attached to the electronic apparatus of FIG. 12.
Figure 14:
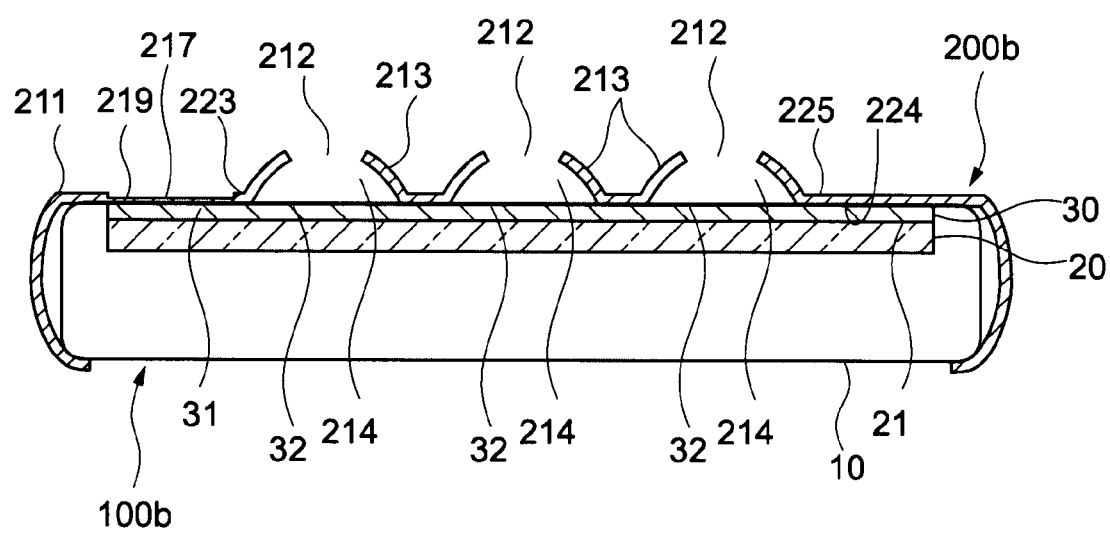
FIG. 14 is a schematic cross-sectional diagram showing the input assisting apparatus and the electronic apparatus that are taken along the line C-C of FIG. 13.
Figure 14:
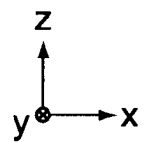

FIG. 13 is a plan view showing a state where an input assisting apparatus 200b according to Modified example 2 is attached to the electronic apparatus 100b. FIG. 14 is a schematic cross-sectional diagram showing the input assisting apparatus 200b and the electronic apparatus 100b that are taken along the line C-C of FIG. 13.

As shown in those figures, a portion excluding the dome portions 213 of the main plate portion 211 includes a first portion 223 having a first thickness and a second portion 219 that has a second thickness smaller than the first thickness and corresponds to the touch pad input area 31.

Here, a surface of the main plate portion 211 that faces the touch sensor panel 30 is referred to as a "first surface 224", a surface of the first portion 223 out of the surface on the opposite side is referred to as a "second surface 225", and a surface of the second portion 219 is referred to as a "third surface 217". The second portion 219 corresponding to the touch pad input area 31 is depressed so that a distance between the second surface 225 of the first portion 223 and the surface of the touch sensor panel 30 becomes larger than a distance between the third surface 217 of the second portion 219 and the surface of the touch sensor panel 30. In this case, a thickness of the second portion 219 is selected such that a change in a capacitance by the touch sensor panel 30 at the second portion 219 is detectable. Thus, the touch sensor panel 30 easily detects the change in the capacitance at the second portion 219 as compared to the first portion 223 of the main plate portion 211. Accordingly, it is possible to perform an input operation well with respect to the touch pad input area 31 using the input assisting apparatus 200b.

MODIFIED EXAMPLE 3

Next, another modified example of an input assisting apparatus will be described as Modified example 3.

Figure 19:
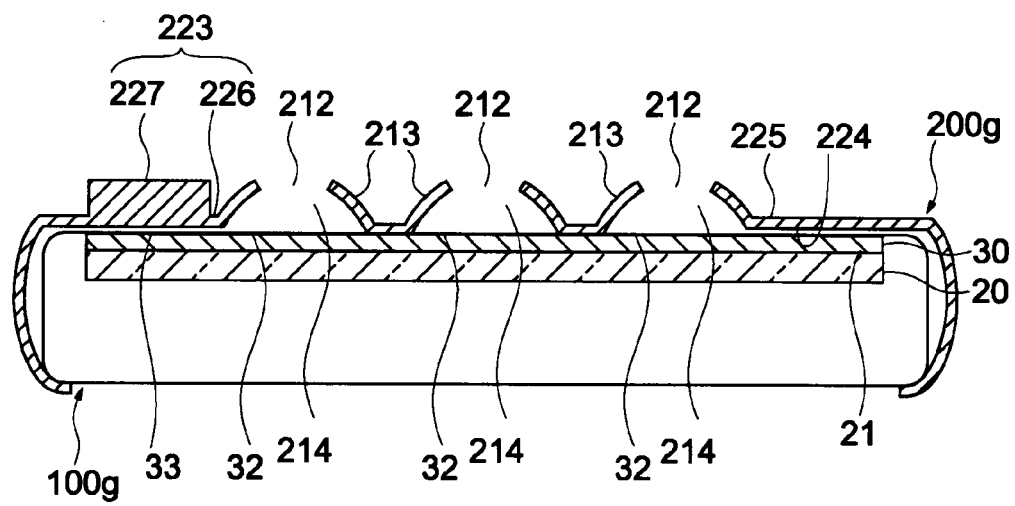
FIG. 19 is a schematic cross-sectional diagram for explaining an input assisting apparatus according to Modified example 3.
Figure 19:
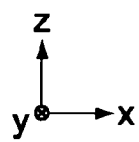

FIG. 19 is a schematic cross-sectional diagram showing a state where an input assisting apparatus 200g according to Modified example 3 is attached to an electronic apparatus 100g. In the electronic apparatus 100g according to Modified example 3, a certain input area 32 on the touch sensor panel 30 is set as an prohibition area 33 in which an input from a user to an UI is prohibited in a specific display mode.

The first portion 223 of the main plate portion 211 includes a third portion 226 having the first thickness and a fourth portion 227 that has a third thickness larger than the first thickness and corresponds to the prohibition area 33. The fourth portion 227 corresponding to the prohibition area 33 is caused to protrude from the second surface 225 so that a distance between the second surface 225 of the fourth portion 227 and the surface of the touch sensor panel 30 becomes larger than a distance between the second surface 225 of the third portion 226 and the surface of the touch sensor panel 30. In this case, a thickness of the fourth portion 227 is selected such that a change in a capacitance by the touch sensor panel 30 at the fourth portion 227 is undetectable. Accordingly, it is possible to prohibit an input to the prohibition area 33 from being made by the user when an input operation with respect to an UI is performed through the touch sensor panel 30.

MODIFIED EXAMPLE 4

Next, still another modified example of an input assisting apparatus will be described as Modified example 4.

Figure 15:
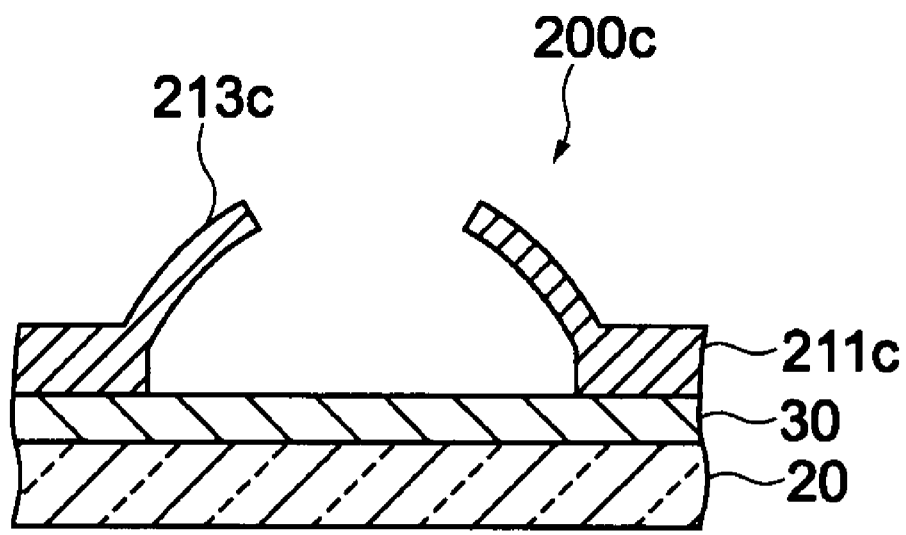
FIG. 15 is a diagram for explaining an input assisting apparatus according to Modified example 4.
Figure 15:
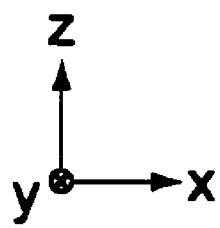

FIG. 15 is a diagram for explaining an input assisting apparatus 200c according to Modified example 4.

An increase in the thickness of the main plate portion 211 of the input assisting apparatus 200 of the above embodiment is effective in securing a thickness necessary for preventing an erroneous detection in the input area 32 of the touch sensor panel 30. However, the dome portion 213 becomes difficult to be elastically deformed as the thickness of the dome portion 213 is increased, and a large force is needed to press the input area 32, which impairs the operability of the dome portion 213. Conversely, when the thickness of the main plate portion 211 of the input assisting apparatus 200 of the above embodiment is reduced, the dome portion 213 becomes easy to be elastically deformed but an erroneous detection on the touch sensor panel 30 becomes liable to occur at a portion other than the dome portions 213 of the main plate portion 211.

In this regard, in the input assisting apparatus 200c according to Modified example 4, a thickness of a dome portion 213c is made smaller than a thickness of a portion other than the dome portions 213c in a main plate portion 211c. Accordingly, it is possible to suppress occurrence of an erroneous detection on the touch sensor panel 30 at a portion other than the dome portions 213c while ensuring the operability of the dome portion 213c.

MODIFIED EXAMPLE 5

Next, still another modified example of an input assisting apparatus will be described as Modified example 5.

Figure 20:
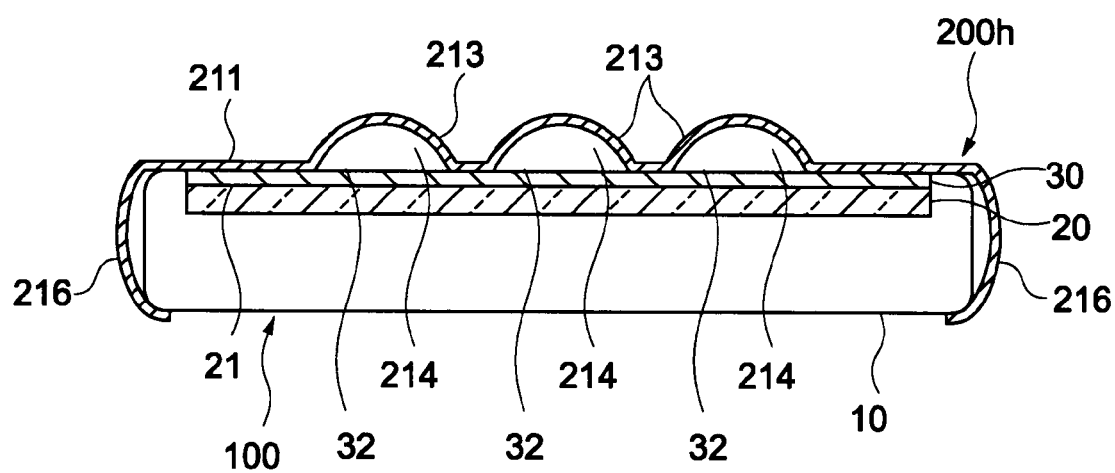
FIG. 20 is a diagram showing an input assisting apparatus according to Modified example 5.

All the dome portions 213 are provided with the opening portions 212 in the embodiment described above, but the present invention is not limited thereto. For example, in a case where visibility of UI elements is ensured to some extent by manufacturing the main plate portion 211 with a transparent or translucent material, the opening portion 212 may not be provided to a part or all of the dome portions 213 as shown in an input assisting apparatus 200h of FIG. 20.

The capacitive-type touch sensor panel 30 detects a position by capturing a change in a capacitance generated between a fingertip and a conductive film. Therefore, in a case where a dome portion 213 that does not have an opening portion is adopted, it is necessary to sufficiently reduce the thickness of the dome portion 213 so that a capacitive coupling between the fingertip and the conductive film is sufficiently obtained.

MODIFIED EXAMPLE 6

Next, still another modified example of an input assisting apparatus will be described as Modified example 6.

FIG. 16 are diagrams showing an input assisting apparatus 200d according to Modified example 6.

An optimum height of the dome portion 213 depends on a user. However, in the input assisting apparatuses 200 heretofore described, the height of the dome portion 213 is limited due to restrictions on the size of each input area 32, the thickness of the main plate portion 211, the size of the opening portion 212, a material, etc. in the electronic apparatus 100.

Figure 16A:
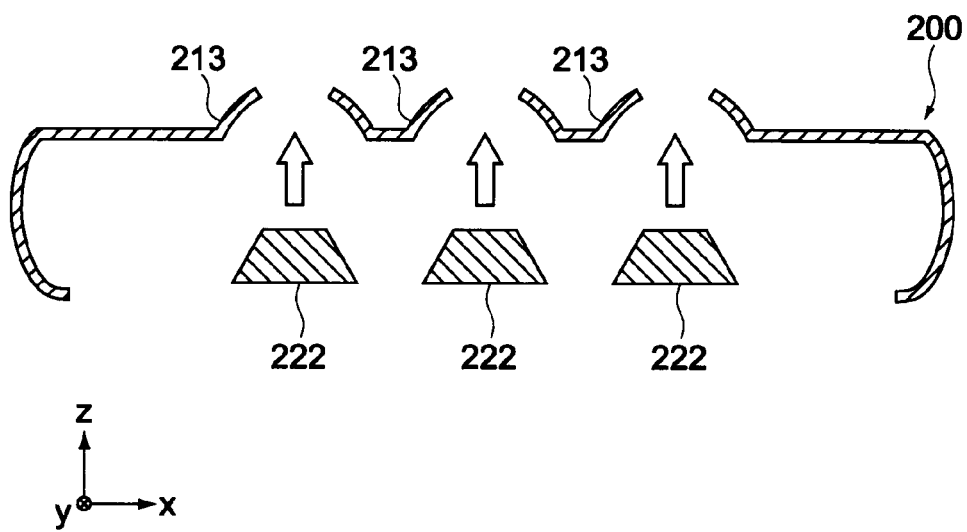
FIG. 16 are schematic cross-sectional diagrams for explaining an input assisting apparatus according to Modified example 6.
Figure 16B:
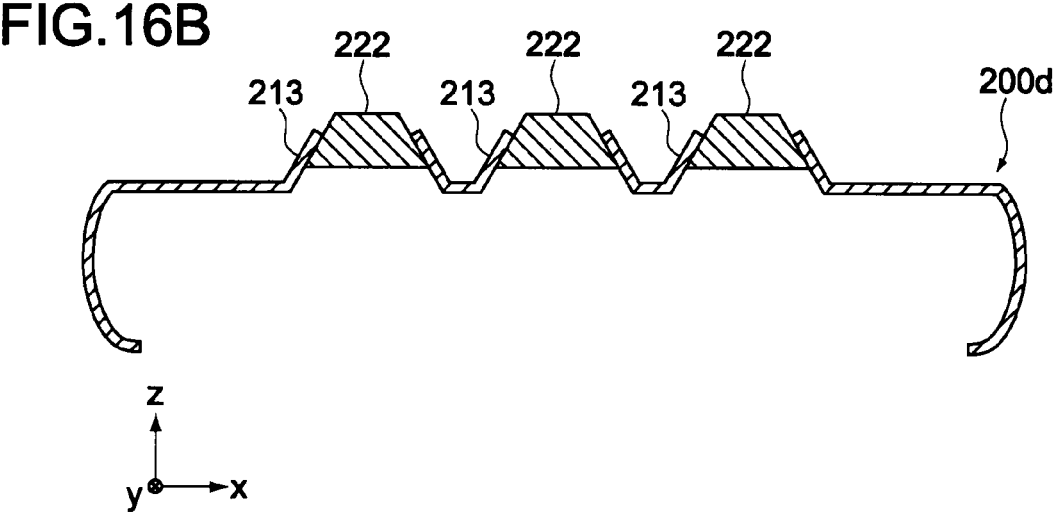

In this regard, in Modified example 6, a degree of flexibility in selecting the height of a key portion corresponding to the dome portion 213 is increased by fitting substantially circular-truncated-cone-shaped conductive rubber 222 into the dome portion 213 of the input assisting apparatus 200 and fixing it with an adhesive or the like. As shown in FIG. 16A, the conductive rubber 222 is inserted into the dome portion 213 from the surface side of the main plate portion 211 that faces the electronic apparatus 100 and is fixed in a state where a portion on a small diameter side is inserted up to a position at which it protrudes from the opening portion 212 of the dome portion 213 as shown in FIG. 16B. Here, the conductive rubber 222 only needs to be an elastic member having conductivity.

According to the input assisting apparatus 200d of Modified example 6, the height of the key portion corresponding to the dome portion 213 can be changed.

OTHER EXAMPLES

Next, modified examples of a detachment structure of an input assisting apparatus with respect to an electronic apparatus will be described.

Figure 17:
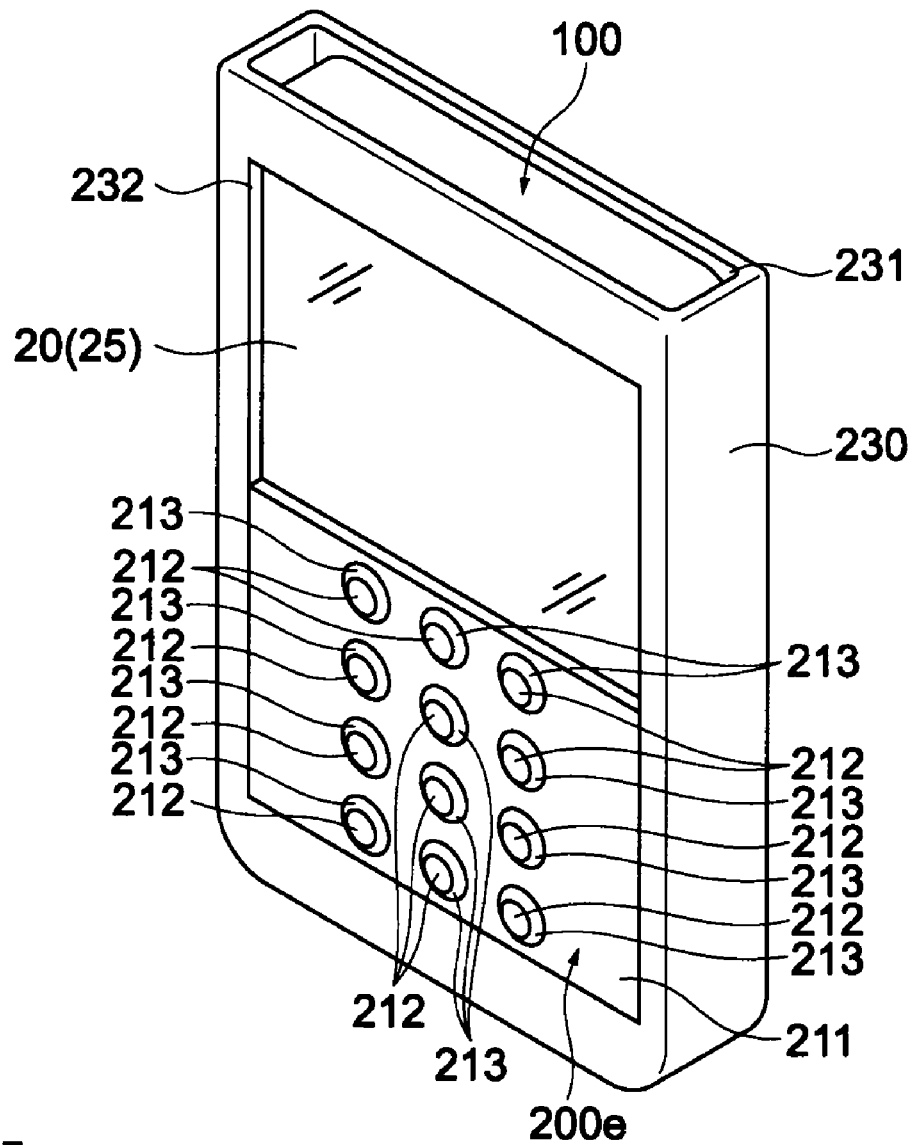
FIG. 17 is a view showing an input assisting apparatus according to another modified example.
Figure 17:
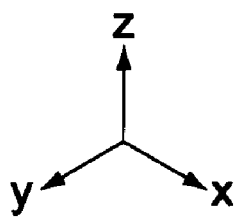

FIG. 17 is a modified example in which an input assisting apparatus is a case-type input assisting apparatus 200e. As shown in FIG. 17, a case 230 includes two surfaces one of which is provided with an opening portion 231 for inserting/removing the electronic apparatus 100 and the other of which is provided with a display-area-exposing opening portion 232 for exposing the display area 21 of the display panel 20 of the electronic apparatus 100. At a position of the display-area-exposing opening portion 232 that corresponds to the UI area 24 in the display area 21, the main plate portion 211 having the dome portions 213 is arranged.

Further, the magnetic sheet 220 or the protrusion 221 for detecting that the electronic apparatus 100 is attached may be provided at a predetermined portion of an inner surface of the case 230, and the magnetic sensor 52 or the switch 53 may be provided to the electronic apparatus 100 in accordance with the magnetic sheet 220 or the protrusion 221 (not shown).

Figure 18:
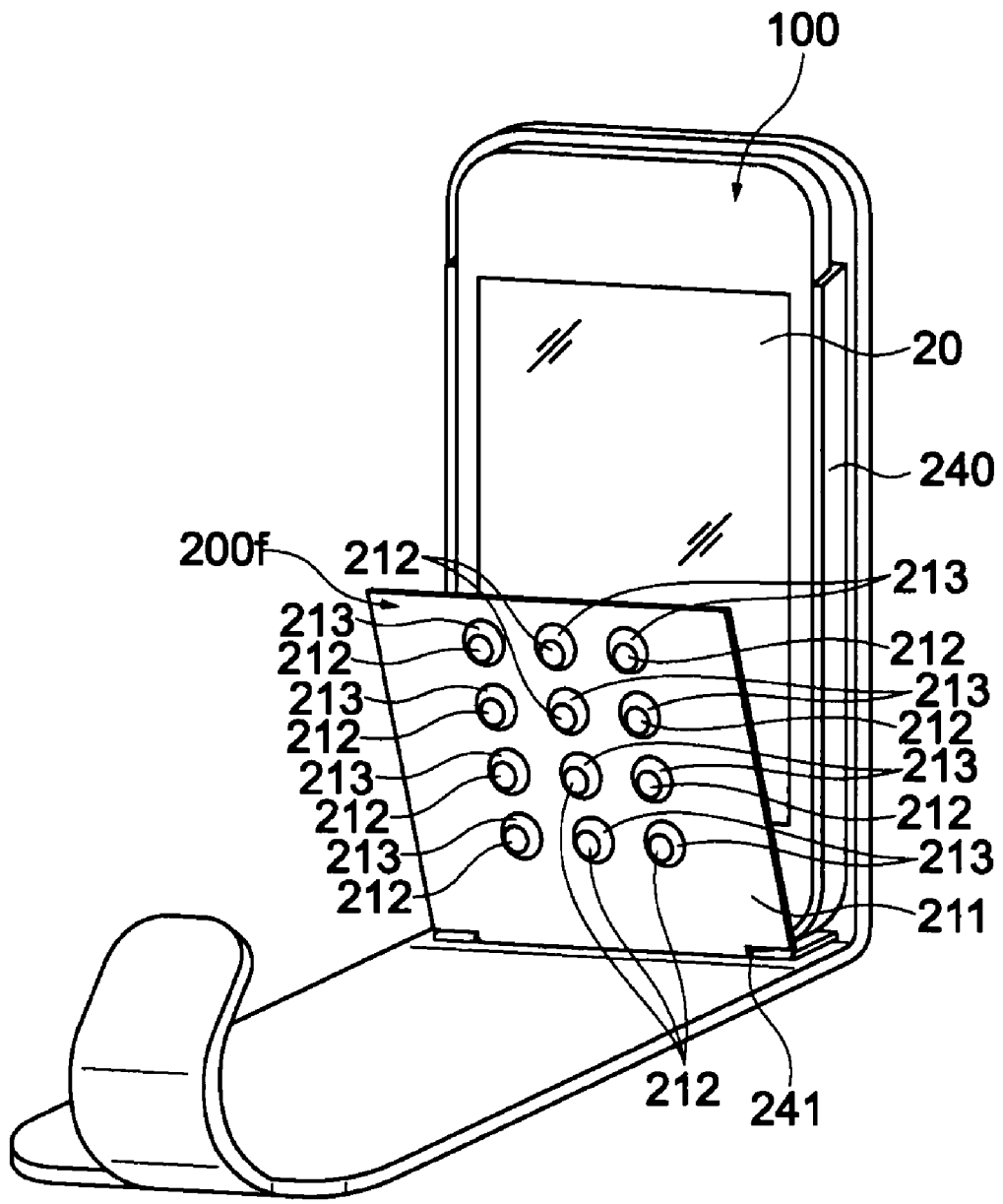
FIG. 18 is a view showing an input assisting apparatus according to still another modified example.

FIG. 18 is a modified example in which an input assisting apparatus is a case-type input assisting apparatus 200f. As shown in FIG. 18, the main plate portion 211 including the dome portions 213 may be rotatably attached to a case 240 via a hinge 241, the case 240 being detachable from the electronic apparatus 100. The main plate portion 211 including the dome portions 213 is rotated by a user between a first position at which an input operation to the touch sensor panel 30 of the electronic apparatus 100 becomes possible and a second position at which the main plate portion 211 is away from the electronic apparatus 100 and is detachable from the electronic apparatus 100, with the hinge 241 being a fulcrum.

The embodiment according to the present invention is not limited to the above, and other various embodiments are conceivable.

The terminal apparatuses such as a cellular phone and a portable audio-visual apparatus have been taken as an example of the electronic apparatus, but the electronic apparatus is not limited thereto. Examples of the electronic apparatus include a potable game apparatus, a PDA (Personal Digital Assistance), an on-screen keyboard, an electronic dictionary, a camera, a display apparatus, an audio-visual apparatus, a projector, a game apparatus, a robot apparatus, and other electric appliances.

The present application contains subject matter related to that disclosed in Japanese Priority Patent Application JP 2009-132721 filed in the Japan Patent Office on Jun. 2, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input assisting apparatus that is detachable from an electronic apparatus including a touch sensor panel including a plurality of first input areas assigned with input information, the input assisting apparatus comprising:
  a main body having a first surface and a second surface, the first surface facing the touch sensor panel when the input assisting apparatus is attached to the electronic apparatus, the second surface being on an opposite side of the first surface;
  one or more elastically-deformable bulge portions that respectively correspond to one or more first input areas of the plurality of first input areas of the touch sensor panel and are provided to bulge from the second surface of the main body; and
  opening portions that are provided to the one or more bulge portions and expose at least a part of the one or more first input areas corresponding to the one or more bulge portions.

2. The input assisting apparatus according to claim 1, wherein the bulge portions have a thickness smaller than a thickness of a portion of the main body excluding the bulge portions.

3. The input assisting apparatus according to claim 2, wherein the touch sensor panel further includes a second input area for acquiring information on a trail of a position that is designated by a user,
  wherein the portion of the main body excluding the bulge portions includes a first portion having the second surface and a first thickness and a second portion having a third surface and a second thickness smaller than the first thickness and corresponding to the second input area, and a distance between the second surface of the first portion and a surface of the touch sensor panel is larger than a distance between the third surface of the second portion and the surface of the touch sensor panel.

4. The input assisting apparatus according to claim 3, further comprising an engagement portion that is detachably attached to the electronic apparatus.

5. An electronic apparatus, comprising:
  a touch sensor panel including a plurality of first input areas assigned with input information;
  a display capable of selectively displaying a first screen including a plurality of user interface elements that correspond to the plurality of first input areas of the touch sensor panel and a second screen that is different from the first screen;
  a detector to detect that an input assisting apparatus is attached, the input assisting apparatus including
    a main body having a first surface and a second surface, the first surface facing the touch sensor panel when the input assisting apparatus is attached to the electronic apparatus, the second surface being on an opposite side of the first surface,
    one or more elastically-deformable bulge portions that respectively correspond to one or more first input areas of the plurality of first input areas of the touch sensor panel and are provided to bulge from the second surface of the main body, opening portions that are provided to the one or more bulge portions and expose at least a part of the one or more first input areas corresponding to the one or more bulge portions, and an engagement portion that is detachably attached to the electronic apparatus; and a switching section to switch display from the second screen to the first screen when the detector detects that the input assisting apparatus is attached in a case where the second screen is displayed on the display.

* * * * *